United States Patent
Kim et al.

(10) Patent No.: US 12,094,434 B2
(45) Date of Patent: Sep. 17, 2024

(54) ELECTRONIC DEVICE FOR CHANGING ATTRIBUTES OF DISPLAY AND OPERATION METHOD IN ELECTRONIC DEVICE

(71) Applicant: SAMSUNG ELECTRONICS CO., LTD., Suwon-si (KR)

(72) Inventors: Seungryeol Kim, Suwon-si (KR); Wonhee Choe, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 192 days.

(21) Appl. No.: 17/741,762

(22) Filed: May 11, 2022

(65) Prior Publication Data

US 2022/0270566 A1 Aug. 25, 2022

Related U.S. Application Data

(63) Continuation of application No. PCT/KR2020/015899, filed on Nov. 12, 2020.

(30) Foreign Application Priority Data

Nov. 12, 2019 (KR) .................. 10-2019-0144377

(51) Int. Cl.
G09G 5/00 (2006.01)
G09G 5/02 (2006.01)

(52) U.S. Cl.
CPC .............. *G09G 5/003* (2013.01); *G09G 5/02* (2013.01); *G09G 2320/0666* (2013.01); *G09G 2354/00* (2013.01); *G09G 2360/144* (2013.01)

(58) Field of Classification Search
CPC .. G09G 5/003; G09G 5/02; G09G 2320/0666; G09G 2354/00;
(Continued)

(56) References Cited

U.S. PATENT DOCUMENTS 10,140,952 B1 11/2018 Letourneur
2013/0040276 A1 2/2013 Takakura et al.
(Continued)

FOREIGN PATENT DOCUMENTS

JP 4544948 * 9/2010 ............... G09G 5/02
JP 2011-071680 4/2011
(Continued)

OTHER PUBLICATIONS

International Search Report for PCT/KR2020/015899 dated Feb. 15, 2021, 4 pages.
(Continued)

*Primary Examiner* — Ryan R Yang
(74) *Attorney, Agent, or Firm* — NIXON & VANDERHYE P.C.

(57) ABSTRACT

Various embodiments of the present disclosure relate to an electronic device for changing attributes of a display, and an operation method in an electronic device. The electronic device may be configured to: acquire user information; set user period information for changing attributes of the display based on the acquired user information; acquire information associated with content being displayed on the display or has been determined to be displayed on the display; change an attribute setting value of the display based on set user period information and the information associated with the content; and control the display to display content based on the changed attribute setting value.

11 Claims, 10 Drawing Sheets

(58) Field of Classification Search
CPC ..... G09G 2360/144; G09G 2320/0626; G09G 2380/08; G09G 5/10; G09G 5/001; G06F 3/01; G06F 3/011; G06F 3/14
See application file for complete search history.

(56) References Cited

U.S. PATENT DOCUMENTS

| | | | |
|---|---|---|---|
| 2013/0265232 A1* | 10/2013 | Yun | G09G 3/3208 345/158 |
| 2014/0037109 A1 | 2/2014 | Ban | |
| 2014/0104321 A1 | 4/2014 | Steffy | |
| 2017/0083172 A1* | 3/2017 | Schneider, IV | G06F 3/04812 |
| 2018/0115797 A1* | 4/2018 | Wexler | G06F 3/011 |
| 2019/0026559 A1* | 1/2019 | Zhan | G06F 16/535 |

FOREIGN PATENT DOCUMENTS

| | | | | |
|---|---|---|---|---|
| JP | 2013-041728 | 2/2013 | | |
| JP | 2018-148309 | 9/2018 | | |
| JP | 2019-114931 | 7/2019 | | |
| JP | 2019114931 A * | 7/2019 | ............. | H04N 9/73 |
| KR | 10-2014-0121075 | 10/2014 | | |
| KR | 20140121075 A * | 10/2014 | ............. | G06F 11/30 |
| KR | 10-2016-0147976 | 12/2016 | | |
| KR | 10-2017-0096621 | 8/2017 | | |

OTHER PUBLICATIONS

Written Opinion of the ISA for PCT/KR2020/015899 dated Feb. 15, 2021, 5 pages.

\* cited by examiner

| Color temperature | luminance | Harmful blue energy |
|---|---|---|
| 10000 | 79.7% | (NO additional increase based on default 100%) |
| 9500 | 81.4% | |
| 9000 | 83.7% | |
| 8500 | 87.0% | |
| 8000 | 90.3% | |
| 7500 | 93.6% | |
| 7000 | 100% | |
| 6750 | 99.5% | 97% |
| 6500 | 98.3% | 97% |
| 6250 | 97.6% | 88% |
| 6000 | 96.7% | 83% |
| 5750 | 95.3% | 78% |
| 5500 | 94.3% | 74% |
| 4900 | 91.0% | 61% |
| 4300 | 85.8% | 47% |
| 3700 | 80.2% | 34% |
| 3100 | 73.1% | 20% |
| 3100 | 62.7% | 10% |

FIG.7

ELECTRONIC DEVICE FOR CHANGING ATTRIBUTES OF DISPLAY AND OPERATION METHOD IN ELECTRONIC DEVICE

CROSS-REFERENCE TO RELATED APPLICATIONS

This application is a continuation of International Application No. PCT/KR2020/015899 designating the United States, filed on Nov. 12, 2020, in the Korean Intellectual Property Receiving Office and claiming priority to Korean Patent Application No. 10-2019-0144377, filed on Nov. 12, 2019, in the Korean Intellectual Property Office, the disclosures of which are incorporated by reference herein in their entireties.

BACKGROUND

Field

The disclosure relates to an electronic device for changing attributes of a display in order to aid user biological rhythms, and an operation method in an electronic device.

Description of Related Art

Electronic devices have recently been developed in various types for user convenience. Technical improvements have enabled electronic devices to provide not only call/message services, but also various additional services. Electronic devices may provide a technology for supporting management of the users' biological rhythms and maintenance of the biological rhythms.

In general, biological rhythms refer to biological processes at a circadian cycle according to patterns of biological activities, such as sleeping, eating, body temperature, brain waves, and hormones, in the case of animals including humans, and such circadian cycle rhythms may be adjusted by biological clocks that can be adjusted by external environments, such as light, temperature, and redox cycles.

A user's biological activities may be patterned according to life patterns following circadian cycle (constant cycle) rhythms. If such circadian cycle rhythms are discordant with life patterns, the user may undergo fatigue and working efficiency degradation during active hours. In addition, athletic ability, attention/concentration, and determination are degraded, and irritation, nervousness, depression, restlessness, and other emotional problems occur.

As described above, a discordance between circadian cycle rhythms and the user's life patterns may cause an inconvenience of having to induce sleep by manually adjusting peripheral light sources, and in an environment in which an electronic device is used as a major light source rather than peripheral light sources, the light source of the electronic device may vary the user's biological rhythms.

SUMMARY

Embodiments of the disclosure may provide an electronic device for changing attributes of a display to support maintenance of a user's biological rhythms in an environment in which the electronic device is used as a major light source rather than peripheral light sources, and an operation method in the electronic device.

According to various example embodiments, an electronic device configured to change an attribute of a display may include: a display, a memory, and at least one processor electrically connected to the display and the memory, wherein the memory stores instructions which, when executed by the at least one processor, cause the at least one processor to: acquire user information, configure user cycle information for changing the attribute of the display based on the acquired user information, acquire information related to content being displayed or determined to be displayed on the display, change an attribute configuration value of the display based on the configured user cycle information and the content-related information, and control the display to display the content on the display based on the changed attribute configuration value.

In addition, an example method of operating an electronic device according to various embodiments may include: acquiring user information, configuring user cycle information for changing an attribute of a display of electronic device based on the acquired user information, acquiring information related to content being displayed or determined to be displayed on the display, changing an attribute configuration value of the display based on the configured user cycle information and the content-related information, and controlling the display to display the content based on the changed attribute configuration value.

In addition, according to an example embodiment, a non-transitory storage medium storing one or more program, the one or more program comprising executable instructions configured to, when executed by at least one processor an electronic device, cause the electronic device to perform operations comprising: acquiring user information, configuring user cycle information for changing an attribute of a display of electronic device based on the acquired user information, acquiring information related to content being displayed or determined to be displayed on the display, changing an attribute configuration value of the display based on the configured user cycle information and the content-related information, and performing control to display the content on the display based on the changed attribute configuration value.

An electronic device and an operation method in the electronic device, according to various example embodiments, are advantageous in that, in an environment in which the electronic device is used as a major light source rather than peripheral light sources, attribute configuration values of a display are changed based on a cycle configured based on user information and information related to contents currently disposed or determined to be displayed on the display, and contents are displayed on the display according to the changed attribute configuration values, thereby optimizing the user's biological clock, and supporting maintenance of the user's biological rhythms.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 7 is a diagram illustrating an example of attribute values of a display of an electronic device according to various embodiments;

DETAILED DESCRIPTION

Figure 1:
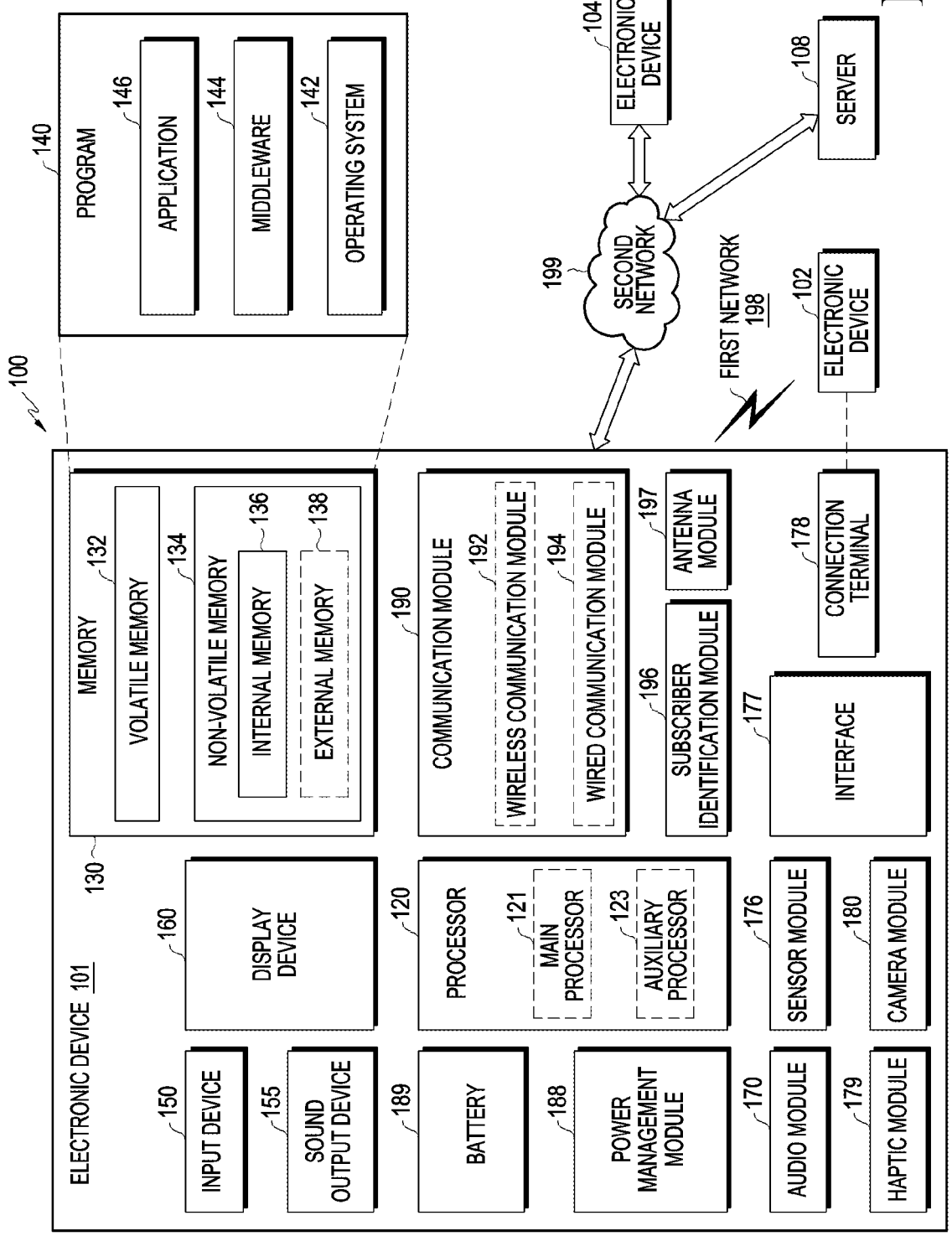
FIG. 1 is a block diagram illustrating an example electronic device in a network environment according to various embodiments.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element including a conductive material or a conductive pattern formed in or on a substrate (e.g., PCB). According to an embodiment, the antenna module 197 may include one or more antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
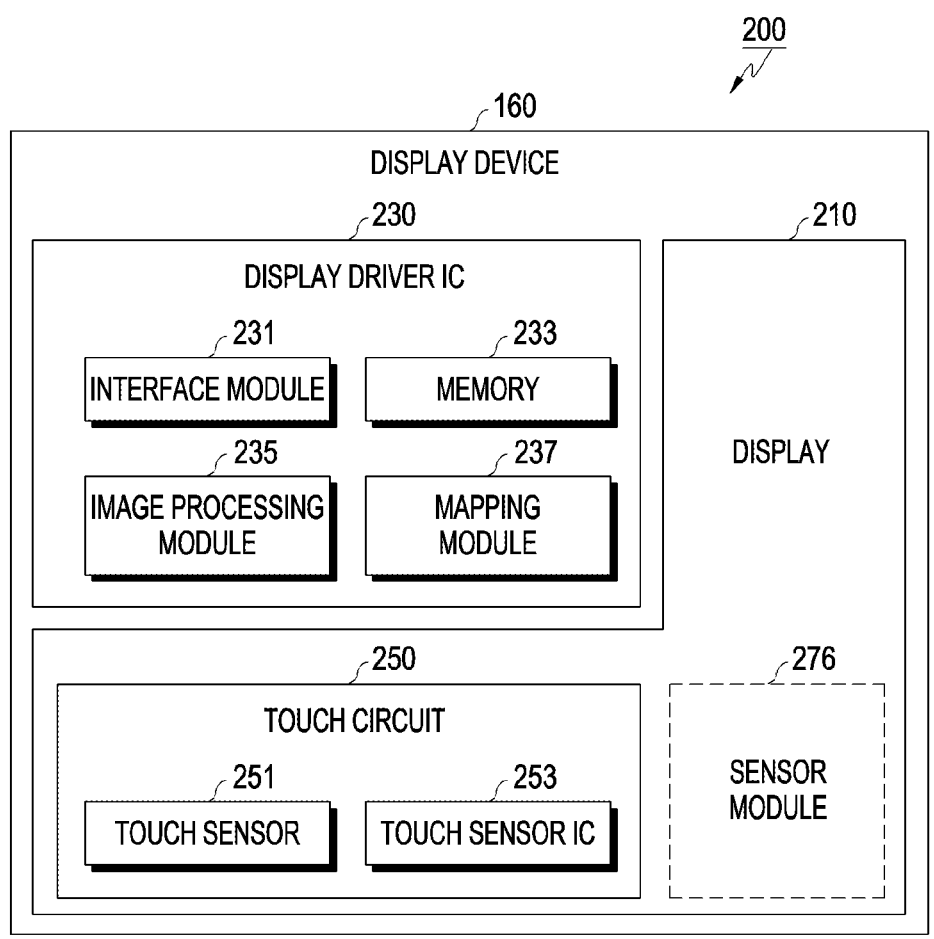
FIG. 2 is a block diagram illustrating an example configuration of a display device according to various embodiments.

FIG. 2 is a block diagram 200 illustrating an example configuration of a display device 160 according to various embodiments. Referring to FIG. 2, the display device 160 may include a display 210 and a display driver IC (DDI) 230 for controlling the display. The DDI 230 may include an interface module (e.g., including processing circuitry and/or executable program instructions) 231, a memory 233 (e.g., a buffer memory), an image processing module (e.g., including processing circuitry and/or executable program instructions) 235, and/or a mapping module (e.g., including processing circuitry and/or executable program instructions) 237. The DDI 230 may receive, for example, image information including image data or an image control signal corresponding to a command for controlling the image data from another element of the electronic device 101 through the interface module 231. For example, according to an embodiment, the image information may be received from a processor 120 (e.g., the main processor 121 (e.g., an application processor) or the auxiliary processor 123 (e.g., a graphic processor) operated independently of the function of the main processor 121. The DDI 230 may perform communication with a touch circuit 250, a sensor module (e.g., including at least one sensor) 276, or the like through the interface module 231. In addition, the DDI 230 may store at least part of the received image information in the memory 233, for example, in units of frames. The image processing module 235 may pre-process or post-process (e.g., adjustment of resolution, brightness, or size), for example, at least part of the image data at least based on a feature of the image data or a feature of the display 210. The mapping module 237 may generate a voltage value or a current value corresponding to the image data pre-processed or post-processed by the image processing module 235. According to an embodiment, the generation of the voltage value or the current value may be performed at least based on, for example, attributes of pixels of the display 210 (e.g., an arrangement of pixels (RGB stripe or pentile structure), or the size of each of sub-pixels). At least some pixels of the display 210 may be driven at least partially based on, for example, the voltage value or the current value, and thus visual information (e.g., text, image, or icon) corresponding to the image data may be displayed through the display 210.

According to an embodiment, the display device 160 may further include a touch circuit 250. The touch circuit 250 may include a touch sensor 251 and a touch sensor IC 253 for controlling the touch sensor. The touch sensor IC 253 may control the touch sensor 251 to detect a touch input or a hovering input for a specific position of the display 210, for example. For example, the touch sensor IC 253 may detect a touch input or a hovering input by measuring a change in a signal (e.g., voltage, quantity of light, resistance, or quantity of electric charge) for a specific position of the display 210. The touch sensor IC 253 may provide information (e.g., location, area, pressure, or time) regarding the sensed touch input or hovering input to the processor 120. According to an embodiment, at least part of the touch circuit 250 (e.g., the touch sensor IC 253) may be included as a part of the display driver IC 230 or the display 210, or may be included as part of another element (e.g., the auxiliary processor 123) arranged outside the display device 160.

According to an embodiment, the display device 160 may further include at least one sensor (e.g., a fingerprint sensor, an iris sensor, a pressure sensor, or an illuminance sensor) of the sensor module 276, or a control circuit therefor. In this case, the at least one sensor or a control circuit therefor may be embedded in a part (e.g., the display 210 or the DDI 230) of the display device 160 or a part of the touch circuit 250. For example, when the sensor module 276 embedded in the display device 160 includes a biometric sensor (e.g., a fingerprint sensor), the biometric sensor may acquire biometric information (e.g., a fingerprint image) associated with a touch input through a partial area of the display 210. According to another example, when the sensor module 276 embedded in the display device 160 includes a pressure sensor, the pressure sensor may acquire pressure information associated with a touch input through a part or the entire area of the display 210. According to an embodiment, the touch sensor 251 or the sensor module 276 may be disposed between pixels of a pixel layer of the display 210, or above or below the pixel layer.

According to various embodiments of the present document, various elements of the electronic device have been described with reference to the electronic device of FIG. 1 and the main elements of the display device have been described with reference to the display device of FIG. 2. However, in various embodiments, all the elements of the electronic device and the elements of the display device illustrated in FIGS. 1 and 2 are not essential elements, and the electronic device and the display device may be implemented to include more or fewer elements than the illustrated elements. In addition, the locations of the main elements of the electronic device and the locations of the elements of the display device, described above with reference to FIG. 1, may be changeable according to various embodiments.

Referring to FIGS. 1 and 2, according to various embodiments, at least one processor 120 of the electronic device 101 may be configured to acquire user information, configure user cycle information to change attributes of the display 210 based on the acquired user information, acquire information (e.g., attributes of at least one object) related to content that is being displayed or determined to be displayed on the display 210, and change an attribute configuration value of the display 210 based on the configured user cycle information and the acquired content-related information. The user cycle information may be a cycle configured based on a circadian rhythm supporting optimization of a user's bio-clock adjusting the user's biological rhythm. The attribute configuration value of the display 210 is an attribute related to a light source of the display 210 and may include at least one of a luminance value and a color temperature value. The light source of the display 210 may be pixels included in the display 210, for example, pixels including sub-pixels of red (R), green (G), and blue (B) colors for displaying specific colors emitting light from the display 210.

According to various embodiments, the processor 120 may be configured to collect user information through the memory 130 and an external electronic device (e.g., the electronic device 102 or 104 of FIG. 1 or a server (e.g., the server 108 of FIG. 1)), and may store the collected user information in a part of the memory 130. According to various embodiments, the processor 120 may be configured to collect user information periodically or whenever a configured event occurs after an application (e.g., bio-clock optimization application) for changing the attribute configuration value of the display 210 has been executed or after a function or a mathematical function has been executed. The user information may include at least one of, for example, alarm information, time information, schedule information, or additional information. The alarm information may include an alarm and/or a timer configuration value configured in the electronic device 101. The time information is information related to a time zone, and may include time zone information corresponding to a configured reference bio-clock or previously changed time zone information. The time information may include world time information (e.g., Greenwich mean time (GMT)) and current time information regarding a country and a region in which the electronic device 101 is located. The schedule information is information indicating a user's schedule, and may include, for example, schedule information configured in applications related to schedule management executed in the electronic device 101 and/or alarm information received from an external device. The additional information may include at least one of a user's health information acquired from an external device or acquired through a health-related application executed on the electronic device 101 and/or a user's biometric information measured by an external device (e.g., a wearable device worn by the user), biorhythm information pre-selected by the user, information on at least one application requiring the user's concentration, location information, and environment information of a device. The additional information may include various additional information that can be used to configure user cycle information in addition to the health information and biometric information.

The processor 120 according to various embodiments may configure operation modes based on user activity and configure a cycle corresponding to each of the configured operation modes in order to change the attributes of the display 210. The preconfigured modes may include at least one of a first operation mode configured based on the time zone information, a second operation mode configured based on alarm information and/or schedule information configured in the electronic device 101, and a third operation mode configured based on time information for intensive use of the electronic device 101 or at least one application that is intensively used or schedule information for intensive use of the electronic device 101. The first operation mode is a mode configured to support optimized biorhythm adaptation according to a change in a reference time according to a business trip or travel, a shift work activity, or a difference in a user's circadian rhythm, for example. The second operation mode is a mode configured to support the user's optimal sleeping time or awakening time, for example. The third operation mode is a mode configured to improve the user's concentration when a part of content provided through an application requiring concentration of the user using the electronic device 101 (e.g., an application for providing a learning content (e.g., a video lecture) or an application for providing important information to the user) is being displayed or is determined to be displayed. The operation modes are not limited thereto, and may be configured to be various modes based on the acquired user information.

According to various embodiments, when a request for changing the attribute configuration value of the display 210 is received, the processor 120 may be configured to acquire a user's current biometric information, and adjust the user cycle information configured to correspond to the user's bio-clock, based on the acquired current biometric information. According to various embodiments, the processor 120 may be configured to adjust user cycle information based on an average cycle obtained by averaging the cycles configured for a predetermined period.

According to various embodiments, the processor 120 may be configured to acquire external illuminance information obtained by measuring the brightness of light displayed when light generated from at least one external light source located in the vicinity of the electronic device 101 reaches on the display 210. According to various embodiments, the processor 120 may be configured to change the attribute configuration value of the display 210 based on the configured user cycle information and the information related to the content being displayed or determined to be displayed on the display 210, and further based on the acquired external illuminance information.

The processor 120 according to various embodiments may be configured to, when changing the attribute configuration value of the display 210, configure at least one of a color temperature value and a luminance value corresponding to the display 210 based on the configured user cycle information. The processor 120 may be configured to adjust at least one of a color temperature value and a luminance value, which are configured by reflecting color information included in information related to content being displayed or determined to be displayed on the display 210, and may change the attribute configuration value of the display 210 using at least one of the adjusted color temperature value and luminance value. According to various embodiments, in connection with the configured user cycle information, when a time interval reaches a time of first interval (e.g., a sleep time interval (10 pm to 6 am), or when a configured specific event has occurred in the first interval, the processor 120 may be configured to change the color temperature value to a configured low value (e.g., the blue series of a white LED, as a white point value, has a low value) and/or change the luminance value (e.g., the brightness value of white) to a configured low value. According to various embodiments, in connection with the configured user cycle information, when a time interval reaches a time of second interval (e.g., a wake-up time interval (6 am to 10 pm) or a time interval in which the electronic device 101 is intensively used), or when a configured specific event has occurred in the first interval, the processor 120 may be configured to change the color temperature value to a configured high value (e.g., the blue series of a white LED, as a white point value, has a high value) and/or change the luminance value (e.g., the brightness value of white) to a configured high value.

According to various embodiments, in connection with the configured user cycle information, when a time interval reaches a time of first interval (e.g., a sleep time interval), or when a configured specific event has occurred in the first interval, the processor 120 may be configured to change the attribute configuration value of the display 210 so as to block a specific color or to decrease the luminous value of a specific color of the display 210. According to various embodiments, in connection with the configured user cycle information, when a time interval is the first interval and the color temperature value included in the attribute of at least one object displayed on the display 210 is greater than the reference temperature value, the processor 120 may be configured to change the attribute configuration value of the display 210 so as to block a specific color or to decrease the luminous value of a specific color of the display 210. The specific color has a strong effect on the movement of the user's circadian rhythm compared to other colors.

According to various embodiments, in connection with the configured user cycle information, when a time interval reaches a time of second interval (e.g., a wake-up time interval or a time interval in which the electronic device is intensively used), or when a configured specific event has occurred in the first interval, the processor 120 may be configured to change the attribute configuration value of the display 210 so as not to block a specific color. According to various embodiments, in connection with the configured user cycle information, when a time interval is the second interval and the color temperature value included in the attribute of at least one object is smaller than the reference temperature value, the processor 120 may be configured to change the attribute configuration value of the display 210 so as not to block a specific color or to increase the luminous value of a specific color of the display 210.

According to various embodiments, the processor 120 may be configured to change the wavelength of light to another wavelength by blocking a specific color (e.g., blue or green series) of the light source of the display 210 or decreasing the luminous value of the specific color. According to various embodiments, the processor 120 may change the light wavelength by lowering the color temperature value so that the content that is being displayed or determined to be displayed on the display includes a small amount of a specific color.

According to various embodiments, the processor 120 may be configured to control to display the content being displayed or determined to be displayed on the display 210, based on the changed configuration attribute value of the display 210. When a signal for performing control to display the content based on the changed attribute configuration value of the display is received from the processor 120, the display 210 may be configured to display the content according to the changed attribute configuration value of the display.

According to various embodiments, the processor 120 may be configured to filter a specific color from all or at least a part of the content (e.g., video or image) being displayed or to be displayed on the display 210, and to perform control to display the content, from which the specific color is filtered out, on the display 210.

Figure 3A:
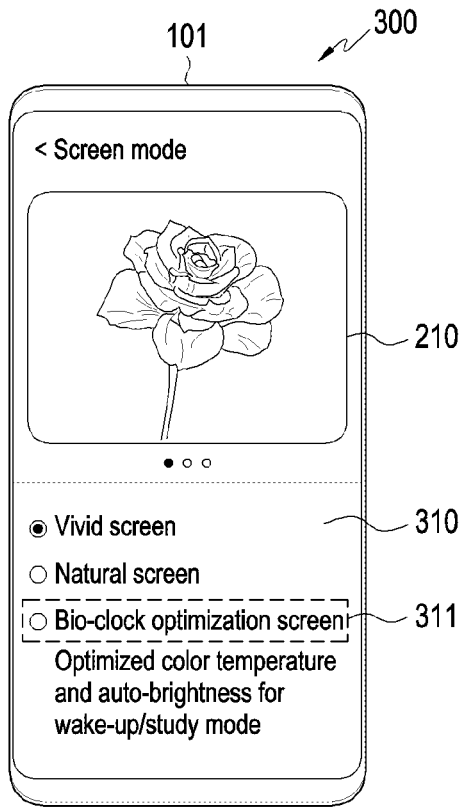
FIGS. 3A, 3B, and 3C are diagrams illustrating an example configuration of an electronic device according to various embodiments.
Figure 3B:
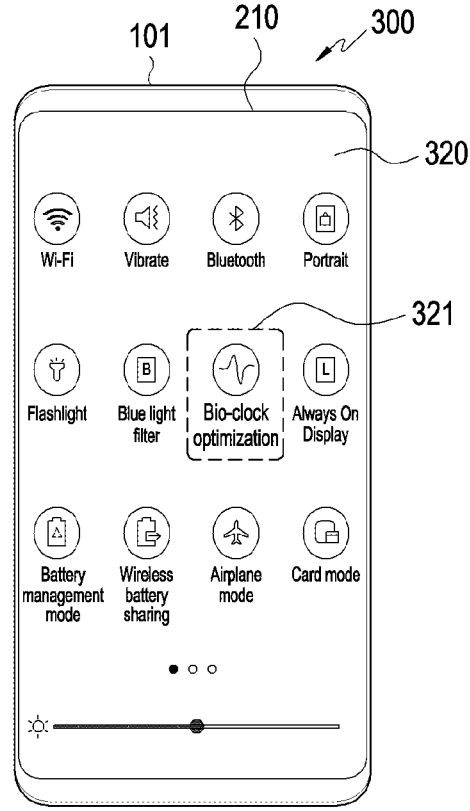
Figure 3C:
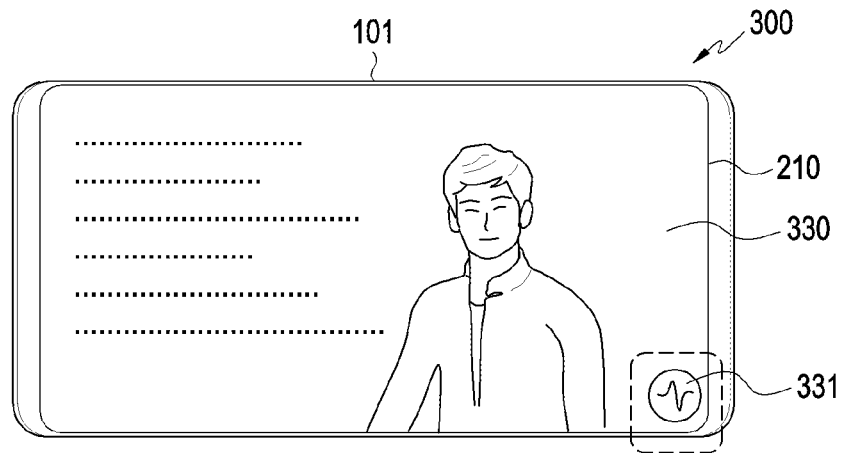

FIGS. 3A, 3B, and 3C are diagrams 300 illustrating example configurations of an electronic device according to various embodiments.

Referring to FIG. 3A, at least one processor (the processor 120 of FIG. 1) of the electronic device 101 according to various embodiments may be configured to control the display 210 to configure a display configuration screen 310 selectable by a user and display the display configuration screen on the display 210). When content is displayed on the display configuration screen 310 through the display, the processor 120 may be configured to provide menus for selecting a screen mode so as to change the attributes of the display according to a preconfigured mode and display the content based on the corresponding mode. For example, the processor 120 may be configured to perform control to display a selection menu (e.g., a bio-clock optimization screen) 311 for configuring the bio-clock optimization screen by changing the attribute configuration value of the display 210. According to various embodiments, when a user selects a selection menu 311 for the bio-clock optimization screen 310, the processor 120 may be configured to execute an application (or program) for changing the attribute configuration value of the display 210, or call a function for changing the configuration value to allow the user himself/herself to perform change. The processor 120 may be configured to display, on the display 210, a screen (e.g., the bio-clock optimization screen 310 or another new screen different from the bio-clock optimization screen 310) including at least one menu indicating a function for changing the configuration value, so as to allow the user himself/herself to perform change.

Referring to FIG. 3B, the processor 120 according to various embodiments may be configured to display, on a screen (e.g., a home screen) 320 of the display 210, an execution object (e.g., an icon) 321 indicating an application (or program) for changing the attribute configuration of the display 210. According to various embodiments, when the execution object 321 is selected, the processor 120 may be configured to execute an application (or program) or functions for changing the attribute configuration value of the display 210.

Referring to FIG. 3C, the processor 120 according to various embodiments may be configured to, when displaying content on the display 210, provide an execution object (or an icon) 331 for the bio-clock optimization on a screen 330, on which the content is displayed, through the display 210. According to an embodiment, when the user selects an execution object for the bio-clock optimization, the electronic device may be configured to change and display at least some attributes of the display 210 based on an application or content being provided to the user. For example, when the user selects the execution object 331 while viewing an image for content displayed on the display 210, the processor 120 may be configured to execute an application (or program) for changing the attribute configuration value of the display 210, and change the attribute configuration value of the display 210 based on the attribute of at least one object for the content displayed on the screen 330.

An electronic device (e.g., the electronic device 101 of FIG. 1) according to one of various embodiments may include a display, a memory, and at least one processor electrically connected to the display and the memory, wherein the memory stores instructions which, when the at least one processor is executed, cause the at least one processor to acquire user information, configure user cycle information for changing the attribute of the display based on the acquired user information, acquire information related to content being displayed or determined to be displayed on the display, change an attribute configuration value of the display based on the configured user cycle information and the content-related information, and perform control to display the content on the display based on the changed attribute configuration value.

According to various embodiments, the memory further stores instructions configured to cause the at least one processor to transmit to the display a control signal for displaying the content on the display based on the changed configuration value, the display may be configured to change the display attribute for the content based on the changed attribute configuration value, and control the display to display the content according to the changed display attribute.

According to various embodiments, the memory may further store instructions which, when executed, cause the at least one processor acquire illuminance information outside the electronic device, and adjust the changed attribute configuration value based on the acquired illuminance information.

According to various embodiments, the memory may further store instructions which, when executed, cause the at least one processor to identify at least one preconfigured operation mode based on the acquired user information, wherein the user cycle information is configured corresponding to the identified at least one operation mode, and the user information includes at least one of alarm information, schedule information, time zone information, and additional information.

According to various embodiments, the at least one operation mode may include at least one of a first operation mode configured based on the time zone information, a second operation mode configured based on alarm information and/or schedule information configured in the electronic device 101, and a third operation mode configured based on at least one of at least one intensively used application, a time at which the electronic device is intensively used, or schedule information for intensive use of the electronic device.

According to various embodiments, the attribute configuration value of the display may include at least one of a luminance value corresponding to the display and a color temperature value.

According to various embodiments, the memory may store instructions configured to cause the at least one processor to decrease or increase the luminous value of a specific color of pixels of the display at the time of changing the attribute configuration value of the display.

According to various embodiments, the memory may store instructions which, when executed, cause the at least one processor to, at the time of changing the attribute configuration value of the display, when a time interval in the user cycle information is a first time interval and the color temperature value included in the content-related information is greater than a reference temperature value, change the attribute configuration value of the display to decrease the luminous value of the specific color, and when the time interval in the user cycle information is a second time interval, and the color temperature value included in the content-related information is smaller than the reference temperature value, change the attribute configuration value of the display to increase the luminous value of the specific color of the display.

According to various embodiments, the memory may further store instructions which, when executed, cause the at least one processor to acquire a user's biometric information, and adjust the user cycle information based on the acquired biometric information, wherein the user cycle information is configured based on a circadian cycle of a bio-clock for adjusting the user's biological rhythm.

According to various embodiments, the memory may further store instructions which, when executed, cause the at least one processor to control the display to display an object related to the execution of an application for changing the attribute configuration value of the display.

An operation procedure in the electronic device as described above will be described in greater detail below with reference to the accompanying drawings.

Figure 4:
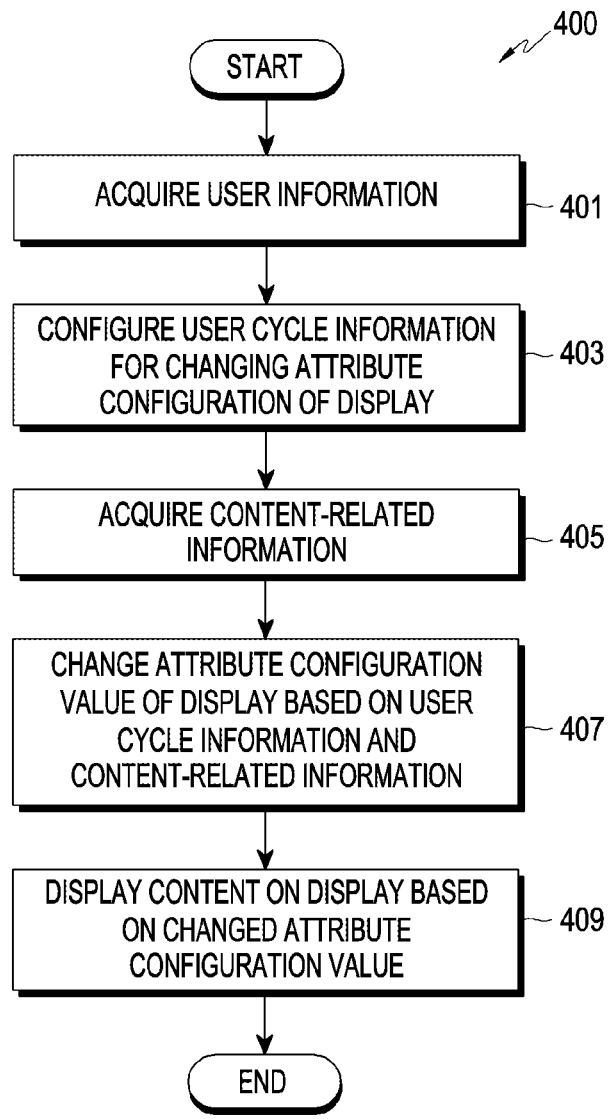
FIG. 4 is a flowchart an example method of operating an electronic device according to various embodiments.

FIG. 4 is a flowchart 400 illustrating an example method of operating an electronic device according to various embodiments.

Referring to FIG. 4, an electronic device (e.g., the electronic device 101 of FIG. 1) (e.g., the processor 120) according to various embodiments may acquire user information through a memory (e.g., the memory 130 of FIG. 1) and an external electronic device (e.g., the electronic device 102 or 104 of FIG. 1 or a server (e.g., the server 108 of FIG. 1), in operation 401. The user information may include at least one of, for example, biorhythm information pre-selected by a user, alarm information pre-configured by the user, the user's schedule information, time information based on the user's location (e.g., time zone information), or additional information (e.g., age, biometric state, gender, location information, or environment information of a device).

In operation 403, the electronic device (e.g., the processor 120) may configure user cycle information for changing the attribute of a display (e.g., the display 210 of FIG. 1) based on the user information. According to an embodiment, the attribute of the display is the attribute of pixels of the display for generating light of a specific color, and may include at least one of a luminance value of light generated from the pixels of the display as a light source of the display, a color temperature value, or a configuration value for controlling the luminance value of a specific color that can be displayed by pixels of the display. According to an embodiment, the configured user cycle information may be configured based on a circadian cycle of a bio-clock for adjusting a circadian rhythm, and may be configured by re-adjusting the reference circadian cycle in a preconfigured reference circadian cycle based on the user information. For example, when the user's circadian cycle is configured based on the time of 9:00 to 12:00 am and the electronic device determines that a user has moved to a different time zone according to the user's location information, the electronic device may recognize the time as 9:00 to 12:00 pm and change the user's circadian cycle. According to various embodiments, the electronic device may adjust the configured user cycle information based on an average cycle obtained by averaging the cycles configured for a predetermined period.

In operation 405, the electronic device (e.g., the processor 120) may be configured to acquire information related to content being displayed or determined to be displayed on the display. For example, when a video is being reproduced through the display, the electronic device may be configured to acquire the attribute of a video object, as information related to the content. According to an embodiment, the electronic device may be configured to identify the type of the video being reproduced, as the attribute of the video object. For example, when the type of content being reproduced is a movie, an Internet lecture, or a concert image, the electronic device may be configured to determine the movie, Internet lecture, or concert image as the attribute of the video object. According to an embodiment, when the content provided by the electronic device on the display is the Internet, the electronic device may be configured to determine the attribute of the object as the type of content (e.g., text, video, or image) being provided through the Internet browser.

In operation 407, the electronic device (e.g., the processor 120) may be configured to change the attribute configuration value of the display based on the configured user cycle information and the content-related information. According to various embodiments, the electronic device (e.g., the processor 120) may be configured to change the attribute configuration value of a partial area of the display. According to various embodiments, the electronic device may be configured to change at least one of a luminance value of the display, a color temperature value, or a configuration value for controlling the luminescence value of a specific color that can be displayed by pixels of the display to block a specific color (e.g., blue or green series).

According to various embodiments, the electronic device (e.g., the processor 120) may be configured to identify a preconfigured mode based on the acquired user information, and configure user cycle information corresponding to the identified operation mode. For example, the operation modes may include at least one operation mode among a first operation mode configured based on time zone information, a second operation mode configured based on alarm information and/or schedule information configured in the electronic device, and a third operation mode configured based on time or schedule information for intensive use of at least one application or electronic device requiring the user's concentration. The first operation mode is a mode configured to support optimized biorhythm adaptation according to a change in a reference time according to a business trip or travel, a shift work activity, or a difference in a user's circadian rhythm, for example. The second operation mode is a mode configured to support the user's optimal sleeping time or awakening time, for example. The third operation mode is a mode configured to improve a user's concentration based on an application (e.g., a video lecture) for providing a learning content to the user or an application for providing important information to the user. The operation modes are not limited thereto, and may be configured as various modes based on the acquired user information.

According to various embodiments, the electronic device (e.g., the processor 120) may be configured to acquire external illuminance information obtained by measuring the brightness of light displayed when light generated from at least one external light source located in the vicinity of the electronic device reaches on the display. According to various embodiments, the processor 120 may be configured to change the attribute configuration value of the display based on the configured user cycle information and the information related to the content being displayed or determined to be displayed on the display, and further based on the acquired external illuminance information.

In operation 409, the electronic device (e.g., the processor 120) may be configured to display content based on the changed attribute configuration value of the display. For example, the cycle of the user's biorhythm is changed in response to the change of a time zone according to the change of the location of the electronic device, and when the content displayed by the electronic device is an Internet web browser and the time zone is determined to be a time zone in which the user needs a good night's sleep, the content may be displayed by partially lowering the luminance of the display.

Figure 5:
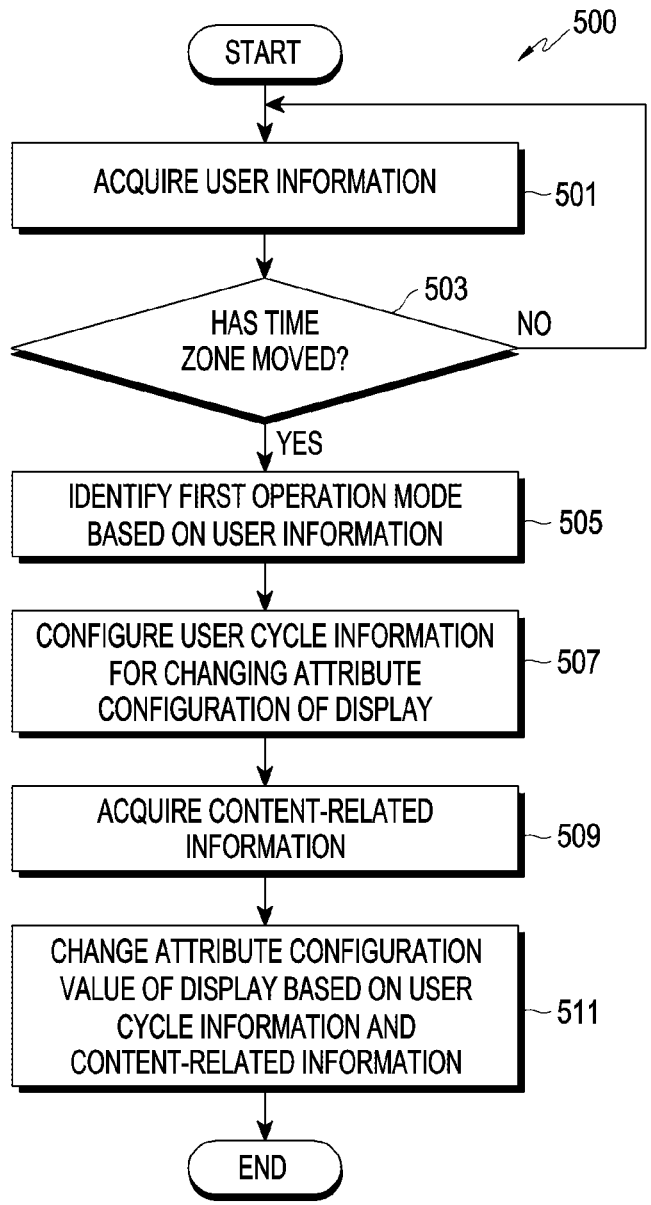
FIG. 5 is a flowchart illustrating an example method of operating an electronic device according to various embodiments.

FIG. 5 is a flowchart 500 illustrating an example method of operating an electronic device according to various embodiments, FIGS. 6A, 6B, 6C and 6D are graphs 600 illustrating an example of a circadian cycle according to an operation procedure of an electronic device according to various embodiments, and FIG. 7 is a diagram 700 illustrating examples of attribute values of a display of an electronic device according to various embodiments.

The electronic device (e.g., the electronic device 101 of FIG. 1) (e.g., the processor 120) according to various embodiments may be configured to execute an application or function (e.g., a mathematical function) for changing the attribute configuration value of the display when the selection menu 311 displayed on the bio-clock optimization clock 310 as shown in FIG. 3A or the execution object 321 as shown in FIG. 3B is selected. According to an embodiment, the electronic device (e.g., the processor 120) may be configured to perform an operation for directly changing the attribute configuration value of the display by calling a function or mathematical functions for the bio-clock optimization when an event for the bio-clock optimization to change the attribute configuration value of the display (e.g., reception of a user gesture or voice command, or a preconfigured reservation time for the bio-clock optimization) occurs.

Referring to FIG. 5, in operation 501, the electronic device (e.g., the processor 120) may be configured to acquire user information and store the acquired user information in a part of a memory (the memory 130 of FIG. 1).

In operation 503, the electronic device (e.g., the processor 120) may be configured to identify whether a time zone has been moved based on time information (e.g., time zone information) included in the user information. According to various embodiments, when the current time is changed to the local time of a country or region in which the electronic device is located due to a business trip or travel by the user, the electronic device (e.g., the processor 120) may be configured to determine that a time zone has been moved. According to an embodiment, when a time zone is directly configured or changed by the user, the electronic device may be configured to determine that the time zone has been moved. The time zone is a time adjusted for each country based on location, and may refer to a time difference based on 0-degree longitude.

According to an embodiment, when the electronic device acquires location information and the location information is determined to indicate a location of a region out of a time zone, the electronic device may determine that the time zone has changed.

In operation 505, the electronic device (e.g., the processor 120) may be configured to identify one of pre-configured operation modes in order to change the attribute of the display based on the acquired user information. For example, the electronic device (e.g., the processor 120) may be configured to acquire time information (e.g., time zone information) and/or location information, as the user information, and when it is identified that the time zone has been moved, the electronic device (e.g., the processor 120) may be configured to identify an operation mode as the first operation mode configured to support optimized biorhythm adaptation according to a change in a reference time according to a business trip or travel, a shift work activity, or a difference in a user's circadian rhythm. According to an embodiment, when the electronic device acquires cycle information configured by a user as the user information, the electronic device may be configured to identify the operation mode as the first operation mode.

Figure 6A:
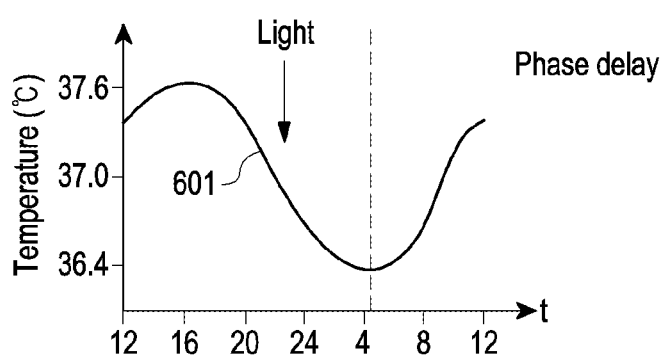
FIGS. 6A, 6B, 6C and 6D are graphs illustrating an example of a circadian cycle according to an operation procedure of an electronic device according to various embodiments.
Figure 6B:
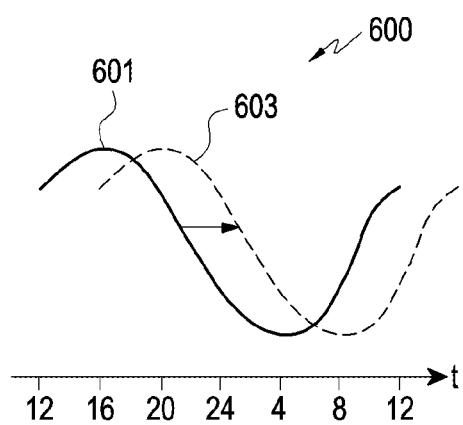
Figure 6C:
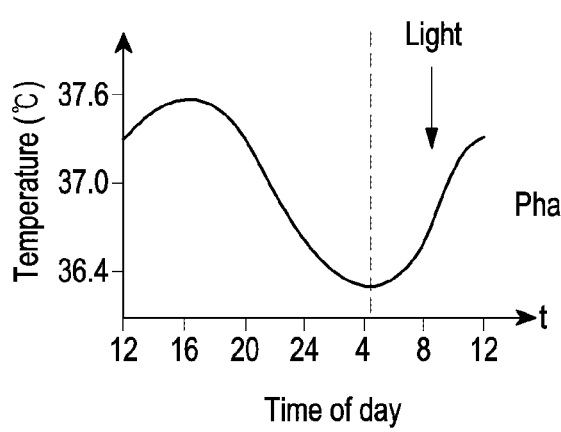
Figure 6D:
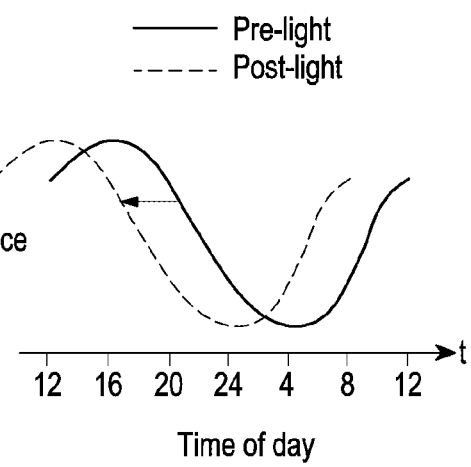

In operation 507, the electronic device (e.g., the processor 120) may configure a cycle for changing the attribute of the display corresponding to the first operation mode. According to various embodiments, when the current time of the electronic device is changed to a time in a region where the 4-hour time difference in South Korea occurs, the electronic device may be configured to adjust the user's circadian bio-clock (e.g., a reference circadian cycle 601) as shown in FIGS. 6A and 6C, to shift the time zone (t) according to the circadian cycle to 4 hours before or 4 hours after according to the standard time of a region in which the electronic device is located. Referring to FIGS. 6A and 6C, the positions of light and night may be changed with reference to 4t. For example, in a case of FIG. 6A, when the left part with reference to 4t corresponds to "light", the right part with reference to 4t in FIG. 6C may be changed to "light". As shown in FIG. 6B or 6D, a circadian cycle 603, obtained by being moved 4 hours before or after the circadian cycle 601, may be configured as user cycle information for changing the attributes of the display.

In operation 509, the electronic device (e.g., the processor 120) may be configured to acquire information related to content being displayed or determined to be displayed on the display. According to various embodiments, the electronic device may be configured to acquire the attribution of color information, a type (e.g., text, image, or video), or metadata of the content. According to an embodiment, the content may include an application displayed on the display of the electronic device. For example, the electronic device may be configured to acquire, as content-related information, information related to the type, characteristic, or configuration of an application that is executed in the electronic device and being displayed on a display.

In operation 511, the electronic device (e.g., the processor 120) may be configured to change the attribute configuration value of the display based on the configured user cycle information and content-related information. The electronic device (e.g., the processor 120) may display content on the display based on the changed attribute configuration value.

According to various embodiments, the electronic device (e.g., the processor 120) may be configured to change the attribute configuration value of at least one display in response to the shifted time zone of the configured cycle 603. According to an embodiment, an operation of changing the attribute configuration value may change multiple attribute configuration values of the display. For example, an operation of blocking a specific color or changing a color temperature while changing the luminance value of the display light source may be sequentially or simultaneously performed. In connection with the operation of changing the attribute configuration value of the display in response to the time zone, since 22 o'clock in the time zone shifted by 4 hours for example corresponds to the start time of sleep or the time zone before the movement correspond to 18 o'clock, the user's bio-clock may be recognized as the time of active activity. Accordingly, the user may have difficulty sleeping according to the bio-clock, and as the user uses the electronic device, the display light source of the electronic device may be used as the main light source and thus sleep may be disturbed. Here, the electronic device (e.g., the processor 120) may be configured to change the attribute configuration value of the display to support the user's sleep. For example, in connection with the operation of changing the attribute configuration value, the electronic device may perform at least one of configuring a luminance value of light generated from pixels of a display to be low, configuring a color temperature value to be low, or decreasing or increasing a luminous value of a specific color (e.g., blue or green series). According to an embodiment, the attribute configuration value of the display may include a change in at least one of brightness, color temperature, color, maximum brightness, maximum color, and average brightness of a partial area of the display. According to an embodiment, an operation of changing the attribute configuration value of the partial area of the display may include an operation of changing the attribute of the display corresponding to at least one object displayed through the display and displaying the object. For example, a part corresponding to at least a part of at least one of an image and text of an object displayed on the display may be changed and displayed. According to an embodiment, the operation of changing the attribute configuration value of the display may include changing a value corresponding to at least one of an initial luminance value, a target luminance value, and a luminance change time, and displaying at least one object through the display in response to the changed attribute configuration value of the display. According to an embodiment, the operation of changing the attribute configuration value of the display may include changing at least a part of the configuration value corresponding to at least one of image quality, color, color reproduction rate, brightness, saturation, contrast ratio, gamma value, luminance, sharpness, backlight, response speed, and resolution of the display, and displaying at least a part of an object through the display. For example, as shown in FIG. 7, the electronic device may configure a lower luminance value of 80.2% from the reference luminance value (e.g., 100%) based on the reference values 701, and may configure the color temperature value to be 3700K from the reference color temperature value (e.g., 7000K). According to various embodiments, in connection with the color attribute of at least one object displayed on the display, a specific color (e.g., blue or green series) has a high value, the electronic device may be configured to adjust the luminance value and/or the color temperature value of the display to be lower than the configured value. For example, the electronic device may generate light, in which a specific color is decreased, from pixels of the display by changing the luminance value to 62.7% and the color temperature value to 3100K. According to various embodiments, when the color attribute of at least one object has a high value of a warm red color, the electronic device may be configured to adjust the color temperature value and/or the luminance value to be higher than the configured values (80.2% and/or 3700K). For example, the electronic device may change the luminance value to 85.8% and the color temperature value to 4300K. According to this configuration, the electronic device may emit light or display an object to a user using the electronic device based on a warm color in which a specific color is decreased to help the user sleep better.

According to various embodiments, when it is 9:00 am shifted by 4 hours in a time zone, the local time is the active time, but the actual user's bio-clock corresponds to 5:00 am. Therefore, the user's body may be recognized as a sleep state. Since the user's bio-clock is recognized as a sleep state, the user may have difficulty in waking up. In this case, the electronic device may provide a display environment corresponding to the changed environment to a user in response to the changed time zone, instead of being based on the user's bio-clock. For example, since the changed time zone corresponds to the time zone of 9:00 am, the electronic device may configure at least one of operations of configuring the luminance value of the light generated from the pixels of the display to be high, configuring the color temperature value to be high, or increasing the luminous value of a specific color (e.g., blue or green series) so as to support the user's awakening. According to various embodiments, as shown in FIG. 7, the electronic device may configure the luminance value to be 100% and configure the color temperature value to be 7000K. When the color attribute of at least one object displayed on the display has a high value corresponding to, for example, a specific color, the electronic device may configure the luminance value or the color temperature value of the display to be lower than the configured value. For example, the electronic device may generate light, having the specific color increased, from pixels of the display by changing the luminance value to be 99.5% and the color temperature value to be 6750K. According to various embodiments, when the color attribute of at least one object displayed on the display has a high warm red color value, the electronic device may be configured to adjust the color temperature value to be higher than the configured value. For example, the electronic device may change the color temperature value to be 7500K as shown in FIG. 7. According to this configuration, the electronic device may configure the display and display at least one object for a user using the electronic device based on a specific color increased and cool color temperature to help the user wake up.

According to various embodiments, the electronic device may gradually change the attribute configuration value of the display for a predetermined period in order to allow the user to easily adapt to the user's biorhythm.

Figure 8:
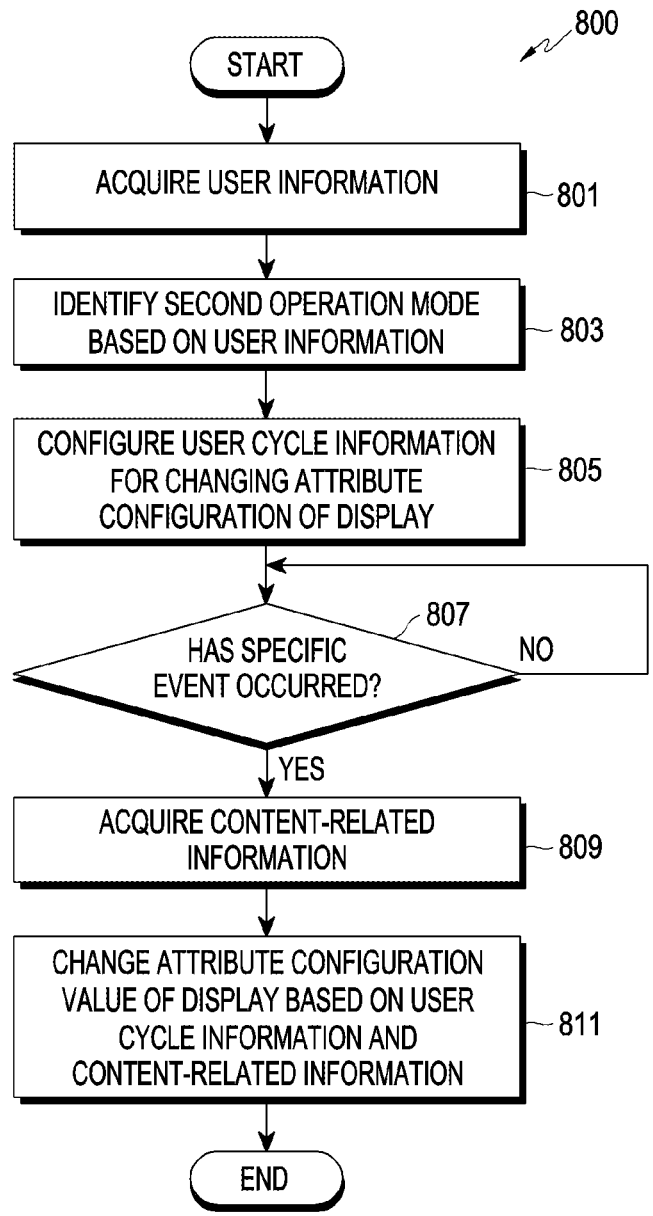
FIG. 8 is a flowchart illustrating an example method of operating an electronic device according to various embodiments.

FIG. 8 is a flowchart 800 illustrating an example method of operating an electronic device according to various embodiments.

Referring to FIG. 8, the electronic device (e.g., the electronic device 201 of FIG. 1) (e.g., the processor 120) according to various embodiments may be configured to execute an application for changing the attribute configuration value of the display when the selection menu 311 as shown in FIG. 3A or the execution object 321 as shown in FIG. 3B is selected.

In operation 801, when an application is executed, the electronic device (e.g., the processor 120) may be configured to collect (e.g., acquire) user information and store the collected user information. The user information may include at least one of, for example, a user's biometric information, notification information, schedule information, time zone information, or additional information (e.g., at least one of biorhythm information pre-selected by a user, location information, device environment information, measured user's biometric information, health information, or information on at least one application requiring user's concentration).

In operation 803, the electronic device (e.g., the processor 120) may be configured to identify a second operation mode from among preconfigured operation modes based on the user information. According to various embodiments, when the electronic device (e.g., the processor 120) acquires alarm information and/or schedule information as the user information, the electronic device (e.g., the processor 120) may be configured to identify an operation mode for changing the attribute of a display based on the acquired alarm information and/or schedule information, as a second operation mode among preconfigured operation modes. The second mode of operation is an operation mode configured to support optimized biorhythm adaptation in order to help biorhythm change according to the alarm information and/or schedule information for example.

In operation 805, the electronic device (e.g., the processor 120) may configure user cycle information to change the attribute of the display corresponding to the second operation mode. According to various embodiments, the electronic device (e.g., the processor 120) may configure user cycle information to change the attribute of the display in response to a second operation mode based on a circadian cycle of the standard bio-clock or pre-configured user cycle information.

In operation 807, the electronic device (e.g., the processor 120) may be configured to identify whether a specific event according to alarm information and/or schedule information has occurred. According to various embodiments, the specific event may be an event for outputting an alarm sound or displaying alarm information at an alarm time configured in the alarm information. According to various embodiments, the specific event may be an event for outputting a notification sound for notifying of a schedule configured in schedule information or displaying a notification message. According to various embodiments, the specific event may be an event for transmitting control information for turning on/off an ambient light source to the ambient light source at the wake-up or bedtime when the alarm information is wake-up or bedtime alarm information. According to various embodiments, the specific event may be an event for transmitting control information related to schedule information to a peripheral device.

As a result of the identification, when a specific event occurs, the electronic device (e.g., the processor 120) may be configured to perform operation 809, and in case that the specific event does not occur, the electronic device (e.g., the processor 120) may be configured to perform operation 807 again.

In operation 809, the electronic device (e.g., the processor 120) may be configured to acquire information related to content being displayed or determined to be displayed on the display. According to various embodiments, the electronic device may be configured to acquire the attribute of at least one of color information, a type (e.g., text, image, or video), or metadata of at least one object.

In operation 811, the electronic device (e.g., the processor 120) may be configured to change the attribute configuration value of the display based on the configured user cycle information and content-related information. The electronic device (e.g., the processor 120) may display content on the display based on the changed attribute configuration value.

In a case of changing the attribute configuration value of the display based on at least one object attribute, for example, when acquiring alarm information in which the sleep alarm is configured at 10:00 pm, the electronic device may be configured to perform at least one operation of changing the luminance value of the light generated from the pixels of the display to be a low value, changing the color temperature value to be a low value, or decreasing a luminous value of a specific color (e.g., blue or green series) so as to identify the sleep alarm application as an object, identify the alarm start time of 10:00 pm as object attribute information, and support the user's sleep at 10:00 pm. For example, as shown in FIG. 7, the electronic device may be configured to lower the luminance value from 100% to 62.7% and change the color temperature value to 3100K.

According to an embodiment, in a case of changing the attribute configuration value of the display based on a configured period, the electronic device may identify information corresponding to the user's bio-clock and identify that the user's wake-up time is 6:00 am. In this case, the electronic device may be configured to perform at least one of operations of configuring a luminance value of light generated from pixels of the display to be high, configuring a color temperature value to be high, or increasing a luminous value of a specific color (e.g., blue or green series). For example, as shown in FIG. 7, the electronic device may configure the luminance value to be 100% and configure the color temperature value to be 7000K. According to various embodiments, the electronic device may be configured to map the wake-up time and the configured attribute configuration values of the display and store the same, and then change the attribute configuration value of the display based on the stored at least one display attribute configuration value at 6:00 am of the wake-up time. According to various embodiments, the electronic device may be configured to change the configuration value of the display based on the attribution of at least one object displayed on the display at 6:00 am according to the configured user cycle information although alarm information does not occur.

According to various embodiments, when the electronic device acquires schedule information configured as, for example, 7:00 am, the electronic device may be configured to change the luminance value of light generated from pixels of the display to a high value before 7:00 am (e.g., 6:00 am), change the color temperature value to a high value, or increase the luminance value of a specific color so as to support the user's awakening. Further, when the user uses the electronic device at 7:00 am, the electronic device may be configured to adjust the changed attribute configuration value of the display based on the attribute of at least one object displayed on the display of the electronic device.

According to various embodiments, when the electronic device acquires alarm information and/or schedule information as the user information and further acquires time information, the electronic device (e.g., the processor 120) may be configured to identify whether a time zone has moved based on the time information. When the time zone has moved, the electronic device (e.g., the processor 120) may be configured to identify the operation mode as a first operation mode among preconfigured operation modes, and may perform the operation procedure as illustrated in FIG. 5. When the time zone has not moved, the electronic device (e.g., the processor 120) may be configured to identify the operation mode as a second operation mode among preconfigured operation modes, and perform the operation procedure as illustrated in FIG. 8.

Figure 9:
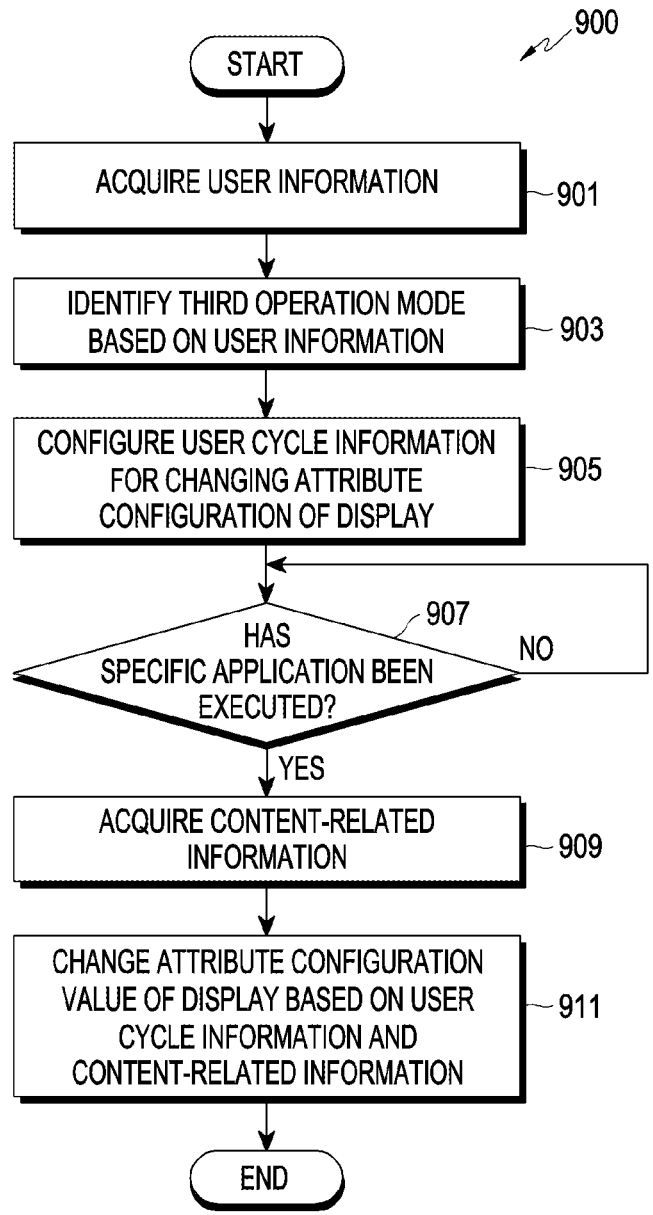
FIG. 9 is a flowchart illustrating an example method of operating an electronic device according to various embodiments.

FIG. 9 is a flowchart 900 illustrating an example method of operating an electronic device according to various embodiments.

Referring to FIG. 9, a processor (the processor 120 of FIG. 1) of an electronic device (e.g., the electronic device 101 of FIG. 1) according to various embodiments may be configured to execute an application for changing the attribute configuration value of the display when the selection menu 311 as shown in FIG. 3A, the execution object 321 as shown in FIG. 3B, or the object 331 as shown in FIG. 3C are selected.

In operation 901, when an application is executed, the electronic device (e.g., the processor 120) may be configured to collect (e.g., acquire) user information and store the collected user information. According to an embodiment, the user information may include at least one of notification information, schedule information, time zone information, or additional information (e.g., at least one of biorhythm information pre-selected by a user, location information, device environment information, measured user's biometric information, health information, or information for at least one application requiring a user's concentration (e.g., an application identifier or an application list)).

In operation 903, the electronic device (e.g., the processor 120) may be configured to identify the operation mode for changing the attribute of the display as a third operation mode among preconfigured operation modes based on the user information. For example, the electronic device (e.g., the processor 120) may be configured to identify the operation mode as a third operation mode when information related to at least one configured application requiring the user's concentration (e.g., an application identifier or an application list) or schedule information for intensive use of the electronic device by the user (e.g., an intensive use time or a time at which the configured application is executed) is obtained as the user information. The third operation mode may be preconfigured, for example, based on an application (e.g., a video lecture) for providing learning content to a user or an application for providing important information to the user.

In operation 905, the electronic device (e.g., the processor 120) may configure a cycle for changing the attribute of the display corresponding to the third operation mode. According to various embodiments, the electronic device (e.g., the processor 120) may configure user cycle information for changing the attribute of the display corresponding to the third operation mode based on the configured circadian cycle of a standard bio-clock or a pre-configured cycle thereof.

In operation 907, the electronic device (e.g., the processor 120) may be configured to identify whether a specific application (or program) corresponding to schedule information included in the information or information related to the application has been executed. As a result of the identification, in case that the specific application has been executed, the electronic device (e.g., the processor 120) may be configured to perform operation 909, and in case that the specific application is not executed, the electronic device (e.g., the processor 120) may be configured to perform operation 907 again. The specific application may be an application for providing a video or image requiring the user's concentration, or an application selected or executed based on the user's intensive use time. According to various embodiments, the electronic device (e.g., the processor 120) may be configured to execute a specific application first as in operation 907, and perform operation 905 as the next operation. For example, as shown in FIG. 3C, when a specific object (e.g., the selection icon 331 in FIG. 3C)) for changing the display configuration based on the bio-clock is provided through an application requiring the user's concentration and, when the object is selected by the user, the electronic device (e.g., the processor 120) may be configured to perform operation 905.

In operation 909, the electronic device (e.g., the processor 120) may be configured to acquire information related to content provided by a specific application, which is displayed on the display and requires the user's concentration. The specific application requiring the user's concentration may include, for example, an application providing learning content to the user or an application providing important information to the user. According to an embodiment, in addition to an application, when the content provided by the application is content requiring the user's concentration, the electronic device may be configured to change the display attribute according to the type and/or characteristic of the content. According to various embodiments, the electronic device (e.g., the processor 120) may be configured to acquire attributes of a color and/or a type (e.g., text, image, or video) of content being displayed or determined to be displayed on a display.

In operation 911, the electronic device (e.g., the processor 120) may be configured to change the attribute configuration value of the display based on the configured user cycle information and content-related information. The electronic device (e.g., the processor 120) may display content on the display based on the changed attribute configuration value.

According to various embodiments, when the specific application (e.g., an application for providing learning content) for providing a video or image requiring concentration, such as a video lecture or an online test is executed, the electronic device (e.g., the processor 120) may be configured to change the luminance value of light generated from pixels of the display to be high, or change the color temperature value to be high, or block a specific color (e.g., blue or green series) so as to enable the user to concentrate. According to an embodiment, when the content requiring concentration, such as the video or online test, is terminated or temporarily suspended while execution of the specific application, the electronic device (e.g., the processor 120) may be configured to change the attribute of the display again. For example, the attribute of the display may be controlled based on whether content requiring concentration has been substantially executed after the application has been executed, in addition to the execution of the application, or whether learning is started. According to various embodiments, the electronic device (e.g., the processor 120) may be configured to adjust the changed attribute configuration value of the display based on the attribute of at least one object displayed on the display. According to various embodiments, the electronic device (e.g., the processor 120) may be configured to adjust only a part of attribute configuration values of the display. For example, the electronic device may be configured to change only the attribute configuration value of the display of the area where the user's gaze is concentrated. According to an embodiment, the attribute change of the display may be performed in response to a partial area of a provided application. For example, the attribute configuration value of the display may be changed with reference to at least a partial area of the application in which content requiring concentration is arranged. For example, when a video lecture is executed, the attribute configuration value of the display may be changed and provided with reference to an area in which a video is reproduced in addition to a menu or controller area of the application. According to various embodiments, the electronic device may be configured to adjust the attribute configuration value of the display based on the attributes of the remaining objects except for the object of the content having a black level or black luminance.

Figure 10:
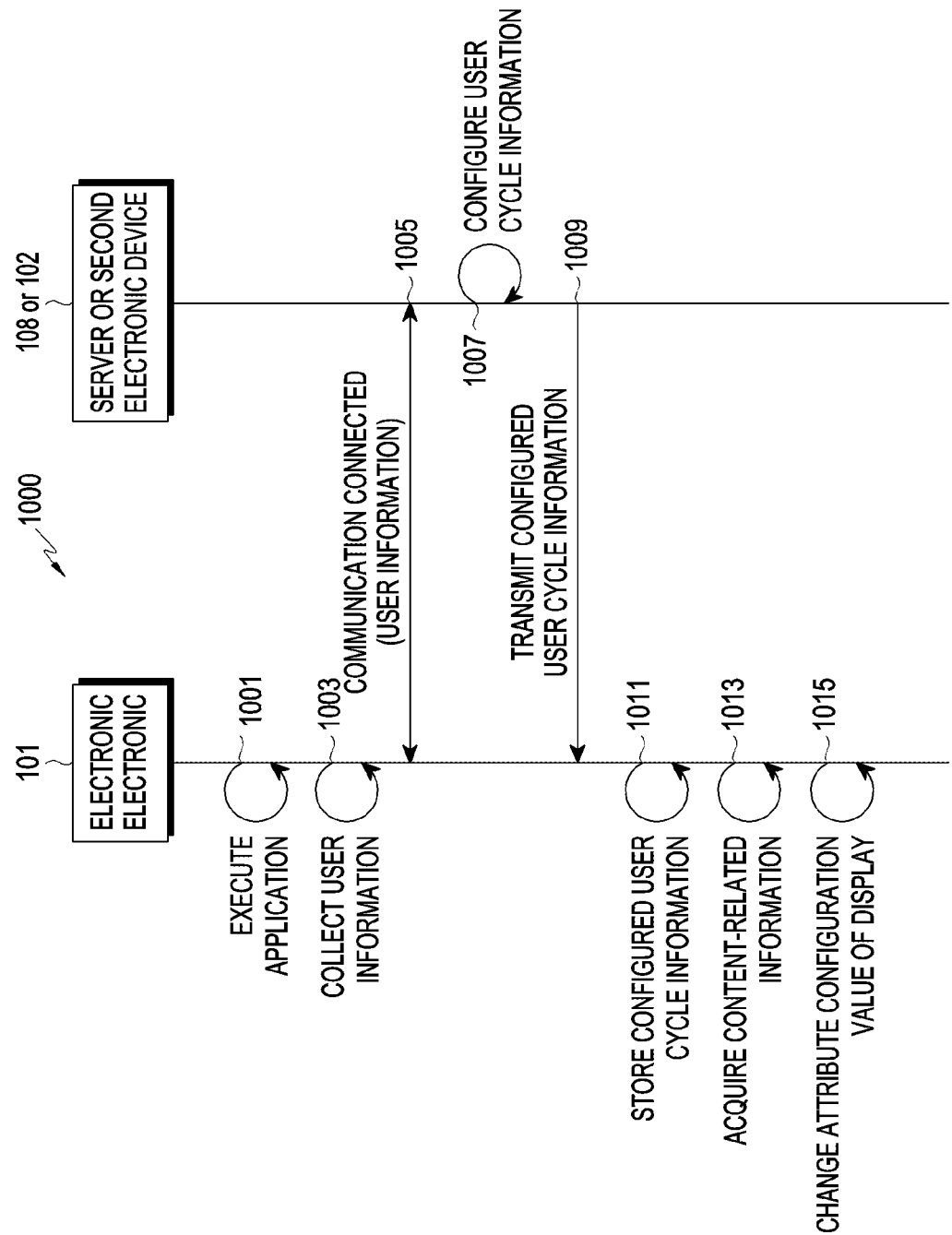
FIG. 10 is a signal flow diagram illustrating an example operation of an electronic device according to various embodiments.

FIG. 10 is a signal flow diagram 1000 illustrating an example operation procedure of changing the attribute configuration value of a display by receiving user cycle information configured through an external electronic device (e.g., a server or a second electronic device) according to various embodiments.

Referring to FIG. 10, an electronic device (e.g., the electronic device 101 of FIG. 1) according to various embodiments may be configured to execute an application (or program), a function, or a mathematical function for changing the attribute configuration value of the display when the selection menu 311 as shown in FIG. 3A, the execution object 321 as shown in FIG. 3B, or the object 331 as shown in FIG. 3C are selected, in operation 1001. According to an embodiment, when a user preconfigures a configuration value for execution of the application according to the circumstances of the electronic device and a condition for execution of the application is satisfied according to the preconfigured configuration value, the application may be executed. According to an embodiment, the execution of the application may be controlled according to a request or a message received by a device outside the electronic device.

In operation 1003, the electronic device 101 may be configured to acquire (e.g., collect) user information. In operation 1005, the server 108 may collect user information based on information received from the electronic device 101 when performing a connection in operation 1003.

In operation 1005, the electronic device 101 may be connected to the server 108 (or the second electronic device 102) to perform communication through a network according to the execution of the application. According to an embodiment, when the electronic device 101 and the server 108 are connected through a network, user information relating to the electronic device 101 or information corresponding to device information may be provided to the server 108. According to an embodiment, the server 108 may further collect other user information in addition to the user information received by the electronic device 101. For example, the server 108 may be configured to acquire and store the user information of the electronic device 101 according to a request of the electronic device 101 or a predetermined scheduling. For example, the server 108 may acquire information for updating user information received by the electronic device 101.

In operation 1007, the server 108 having received the user information from the electronic device 101 may be configured to store the received user information, and configure a cycle to change the attribute configuration value of the display of the electronic device 101 based on the stored user information. In operation 1009, the server 108 may be configured to transmit the configured user cycle information to the electronic device 101.

In operation 1011, the electronic device 101 may be configured to receive information relating to the configured user cycle information from the server 108, and store the received user cycle information.

In operation 1013, the electronic device 101 may be configured to acquire information related to content being displayed or determined to be displayed on the display.

In operation 1015, the electronic device 101 may be configured to change the attribute configuration value of the display based on the user cycle information and content-related information. The electronic device (e.g., the processor 120) may display content on the display based on the changed attribute configuration value.

An example method of operating the electronic device according to various example embodiments may include: acquiring user information, configuring user cycle information for changing an attribute of a display of the electronic device based on the acquired user information, acquiring information related to content being displayed or determined to be displayed on the display, changing an attribute configuration value of the display based on the configured user cycle information and the content-related information, and controlling the display to display the content based on the changed attribute configuration value.

According to various example embodiments of the disclosure, the method may further include: acquiring illuminance information outside the electronic device, and adjusting the changed attribute configuration value of the display based on the acquired illuminance information.

According to various example embodiments of the disclosure, the method may further include: identifying at least one preconfigured operation mode based on the acquired user information, wherein the user cycle information is configured corresponding to the identified at least one operation mode, and the user information includes at least one of alarm information, schedule information, time zone information, or additional information.

According to various example embodiments of the disclosure, the attribute configuration value of the display may include at least one of a luminance value corresponding to the display, a color temperature value, or a configuration value for controlling a luminous value of a specific color by pixels of the display.

According to various example embodiments of the disclosure, the changing of the attribute configuration value of the display may include adjusting a color temperature value or a luminance value corresponding to the display based on the user cycle information and the content-related information.

According to various example embodiments of the disclosure, the changing of the attribute configuration value of the display may include decreasing or increasing the luminous value of a specific color in pixels of the display based on the user cycle information and the content-related information.

According to various example embodiments of the disclosure, the changing of the attribute configuration value of the display may include: changing the attribute configuration value of the display to decrease the luminous value of the specific color when a time interval in the user cycle information is a first time interval and a color temperature value included in the attribute of the at least one object is greater than a reference temperature value, and changing the attribute configuration value of the display to increase the luminous value of the specific color when the time interval in the user cycle information is a second time interval, and the color temperature value included in the attribute of the at least one object is smaller than the reference temperature value.

According to various example embodiments of the disclosure, the method may further include: acquiring a user's biometric information, and adjusting the configured user cycle information based on the acquired biometric information, wherein the configured user cycle information is configured based on a circadian cycle of a bio-clock for adjusting the user's biological rhythm.

According to various example embodiments of the disclosure, the method may further include: controlling the display to display an object related to the execution of an application for changing the attribute configuration value of the display.

A non-transitory computer-readable recording medium may include hard disks, floppy disks, magnetic media (e.g., magnetic tape), optical media (e.g., compact disc read only memory (CD-ROM), digital versatile disc (DVD), magneto-optical media (e.g., floptical disk), hardware devices (e.g., read only memory (ROM), random access memory (RAM), flash memory, etc.), and the like. In addition, the program instructions may include not only machine language codes generated by a compiler, but also high-level language codes that can be executed by a computer using an interpreter or the like. The above-described hardware devices may be configured to operate as one or more software modules to perform the operations of various embodiments, and vice versa.

A module or program module according to various embodiments may include at least one of the above-described elements, omit some of them, or further include other elements. The operations performed by a module, a program module, or another element may be executed sequentially, in parallel, repeatedly, or heuristically. In addition, at least some operations may be executed in another sequence, may be omitted, or another operation may be added.

According to various embodiments, a non-transitory storage medium storing one or more program, the one or more program comprising executable instructions configured to, when executed by at least one processor an electronic device, cause the electronic device to acquire user information, configure a cycle for changing an attribute of a display of the electronic device based on the acquired user information, acquire information related to object attributes for at least one object displayed on the display, and change the attribute configuration value of the display based on the configured cycle and information related to the object attributes.

In addition, the embodiments disclosed herein are provided for description and understanding of the disclosed technical content, and do not limit the scope of the technology described in the disclosure. Therefore, the scope of the disclosure should be construed to include all modifications or various other embodiments based on the technical spirit of this document. Accordingly, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a display;
memory; and
at least one processor electrically connected to the display and the memory,
wherein the memory stores instructions which, when executed by the at least one processor, cause the electronic device to:
display a content based on a first brightness of the display at a first time included in a sleeping time according to a first time zone,
identify that the first time is changed to a second time included an awakening time according to the first time zone,
based on the identification that the first time is changed, display the content based on a second brightness of the display at the second time, wherein the second brightness is brighter than the first brightness,
identify that the first time zone is changed to a second time zone,
display the content based on the second brightness of the display at a third time included in the awakening time according to the second time zone, wherein the third time is a time included in the sleeping time according to the first time zone.

2. The electronic device of claim 1, wherein the instructions cause the electronic device to:
transmit to the display a control signal for displaying the content on the display based on the changed configuration value, change the display attribute for the content based on the changed attribute configuration value, and control the display to display the content according to the changed display attribute, and
the memory further stores instructions which, when executed, cause the at least one processor to control the display to display an object related to execution of an application for changing the attribute configuration value of the display.

3. The electronic device of claim 1, wherein the memory further stores instructions which, when executed, cause the at least one processor to:
acquire illuminance information of an environment outside the electronic device, and
adjust the changed attribute configuration value based on the acquired illuminance information.

4. The electronic device of claim 1, wherein the instructions cause the electronic device to: decrease or increase a luminous value of a specific color in pixels of the display based on changing the attribute configuration value of the display, and
wherein the attribute configuration value of the display includes at least one of a luminance value corresponding to the display, a color temperature value, or a configuration value for controlling the luminous value of the specific color by pixels of the display.

5. The electronic device of claim 1, wherein the instruction cause the electronic device to:
acquire a user's biometric information, and
adjust the user cycle information based on the acquired biometric information,
wherein the user cycle information is configured based on a circadian cycle of a bio-clock for adjusting the user's biological rhythm.

6. A method of, comprising:
displaying a content based on a first brightness of the display at a first time included in a sleeping time according to a first time zone,
identifying that the first time is changed to a second time included an awakening time according to the first time zone,
based on the identifying, displaying the content based on a second brightness of the display at the second time, wherein the second brightness is brighter than the first brightness,
identifying that the first time zone is changed to a second time zone,
displaying the content based on the second brightness of the display at a third time included in the awakening time according to the second time zone, wherein the third time is a time included in the sleeping time according to the first time zone.

7. The method of claim 6, further comprising:
acquiring illuminance information of an environment outside the electronic device; and
adjusting the changed attribute configuration value based on the acquired illuminance information.

8. The method of claim 6, wherein the changing of the attribute configuration value of the display comprises:
adjusting a color temperature value or a luminance value corresponding to the display based on the user cycle information and the content-related information.

9. The method of claim 6, further comprising
acquiring a user's biometric information; and
adjusting the configured user cycle information based on the acquired biometric information,
wherein the configured user cycle information is configured based on a circadian cycle of a bio-clock for adjusting the user's biological rhythm.

10. The method of claim 6, further comprising
controlling the display to display an object related to the execution of an application for changing the attribute configuration value of the display.

11. A non-transitory storage medium storing one or more program, the one or more program comprising executable instructions configured to, when executed by at least one processor an electronic device, cause the electronic device to:
- display a content based on a first brightness of the display at a first time included in a sleeping time according to a first time zone,
- identify that the first time is changed to a second time included an awakening time according to the first time zone,
- based on the identification that the first time is changed, display the content based on a second brightness of the display at the second time, wherein the second brightness is brighter than the first brightness,
- identify that the first time zone is changed to a second time zone,
- display the content based on the second brightness of the display at a third time included in the awakening time according to the second time zone, wherein the third time is a time included in the sleeping time according to the first time zone.

* * * * *